(12) United States Patent
Potnis et al.

(10) Patent No.: US 10,942,821 B1
(45) Date of Patent: Mar. 9, 2021

(54) METHOD AND APPARATUS FOR DYNAMIC BINDING AND UNBINDING THIN LOGICAL STORAGE VOLUMES TO SNAPSHOTS OF A FILE SYSTEM

(71) Applicant: EMC IP HOLDING COMPANY LLC, Hopkinton, MA (US)

(72) Inventors: Ajay Potnis, Pune (IN); Kiran Halwai, Pune (IN); Adnan Sahin, Needham, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 216 days.

(21) Appl. No.: 16/176,136

(22) Filed: Oct. 31, 2018

(51) Int. Cl.
*G06F 16/30* (2019.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/0619* (2013.01); *G06F 3/0665* (2013.01); *G06F 3/0673* (2013.01); *G06F 11/1448* (2013.01); *G06F 2201/80* (2013.01); *G06F 2201/84* (2013.01)

(58) Field of Classification Search
CPC ................................................. G06F 11/1469
See application file for complete search history.

(56) References Cited

U.S. PATENT DOCUMENTS

| 9,965,306 B1* | 5/2018 | Natanzon | G06F 11/1471 |
| 2004/0139240 A1* | 7/2004 | DiCorpo | G06F 3/0683 |
| | | | 710/3 |
| 2013/0054910 A1* | 2/2013 | Vaghani | G06F 3/065 |
| | | | 711/162 |
| 2013/0054932 A1* | 2/2013 | Acharya | G06F 3/067 |
| | | | 711/202 |
| 2013/0055248 A1* | 2/2013 | Sokolinski | H04L 67/1097 |
| | | | 718/1 |

OTHER PUBLICATIONS

Article entitled "EMC—Using Naviseccli to Locate Unused Luns", by Dan, dated Aug. 6, 2012.*
Manual entitled "Dell EMC Unishphere for PowerMax", by Dell, dated Sep. 2018.*
Article entitled "EMC Clariion SnapView Snapshots and Snap Sessions Knowledgebook", by EMC, dated Jan. 2010.*

* cited by examiner

*Primary Examiner* — Mahesh H Dwivedi
(74) *Attorney, Agent, or Firm* — Anderson Gorecki LLP

(57) ABSTRACT

A method of dynamic binding and unbinding thin logical storage volumes to data volumes stored in a storage array includes creating a snapshot copy of a user file system, storing the snapshot copy of the user file system in a data volume in the storage array, and binding a logical storage volume to the data volume. The logical storage volume is then used, by a snapshot file system, to access the data volume. If the data volume is not accessed for a period of time, the logical storage volume is unbound from the data volume while maintaining the snapshot copy of the user file system in the data volume. If an access event later occurs on the data volume, a second logical storage volume is bound to the data volume and used by the snapshot file system to access the data volume in connection with the access event.

18 Claims, 6 Drawing Sheets and apparatus for dynamic binding and unbinding thin logical storage volumes to snapshots of a file system according to some embodiments of the present disclosure.

FIG. 1 is a functional block diagram of an example storage system 120 for use in a storage environment. As shown in FIG. 1, the storage system 120 has physical resources including a number of CPU processor cores 142, local memory 144, operating system 145, storage resources 146, and other physical resources. A hypervisor 148 abstracts the physical resources of the storage system 120 from emulations 150, and allocates physical resources of storage system 120 for use by the emulations 150. In some embodiments, a given storage system 120 may have storage resources 146 that are implemented using an array of discs 160, which may be implemented using a number of different storage technologies.

Each emulation 150 has an operating system 152 and one or more application processes running in the context of the operating system. As shown in FIG. 2, in some embodiments, one or more of the emulations 150 instantiated on storage system 120 implements one or more Virtual Network Attached Storage (VNAS) software applications to enable the emulation to implement a VNAS server 140 on a communication network. As used herein, the term "Virtual Data Mover" (VDM) will be used to refer to one or more software applications configured to execute in an emulation 150 to enable the emulation 150 to implement a VNAS server 140 on the communication network. In the example shown in FIG. 1, emulations 150B-150N include VDM applications 162 and, as such, are configured to implement VNAS servers 140 on the communication network.

Different virtual data movers may be associated with different data clients and in some embodiments groups of VDMs on separate storage systems 120 are organized in storage clusters. A given storage system 120 may have emulations functioning as nodes in multiple storage clusters. In some embodiments, the VDM applications 162 are implemented in software and abstract the underlying data storage provided by the storage system 120.

One or more of the emulations 150 may execute applications configured to control how the underlying storage system 120 manages the underlying storage resources 146. Of relevance to this disclosure, for example, one application that may be executing in an emulation 150 on storage system 120 is a snapshot application (SNAP) 156 configured to provide point in time data copying. Multiple SNAP applications 156 may be executing on a given storage system 120 at any point in time. A "snapshot," as that term is used herein, is a copy of data as that data existed at a particular point in time. A snapshot of a file system, accordingly, is a copy of the data of the file system as the data contained in the file system existed at the point in time when the snapshot of the file system was created.

FIG. 2 is a functional block diagram of one emulation of the storage system of FIG. 1 according to some embodiments of the present disclosure. As shown in FIG. 2, a virtual data mover 162 on storage system 120 includes a VDM root file system 170 and a VDM configuration file system 172. The VDM root file system 170 contains data describing the VDM and the VDM configuration file system 172 describes how the data is stored in underlying memory resources 160 provided by the storage system 120.

The storage system 120 presents storage to the VDM 162 as a set of thin logical storage volumes, referred to herein as Thin Logical Units (TLUs) 174. A TLU 174 is a logical construct which enables the physical storage resources 160 to be abstracted from the VDM 162. The logical storage

METHOD AND APPARATUS FOR DYNAMIC BINDING AND UNBINDING THIN LOGICAL STORAGE VOLUMES TO SNAPSHOTS OF A FILE SYSTEM

BACKGROUND

This disclosure relates to computing systems and related devices and methods, and, more particularly, to a method and apparatus for dynamic binding and unbinding thin logical storage volumes to snapshots of a file system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

A method of dynamic binding and unbinding thin logical storage volumes to data volumes stored in a storage array includes creating a snapshot copy of a user file system, storing the snapshot copy of the user file system in a data volume in the storage array, and binding a logical storage volume to the data volume. The logical storage volume is then used, by a snapshot file system, to access the data volume. If the data volume is not accessed for a period of time, the logical storage volume is unbound from the data volume while maintaining the snapshot copy of the user file system in the data volume. If an access event later occurs on the data volume, a second logical storage volume is bound to the data volume and used by the snapshot file system to access the data volume in connection with the access event.

DETAILED DESCRIPTION

Figure 1:
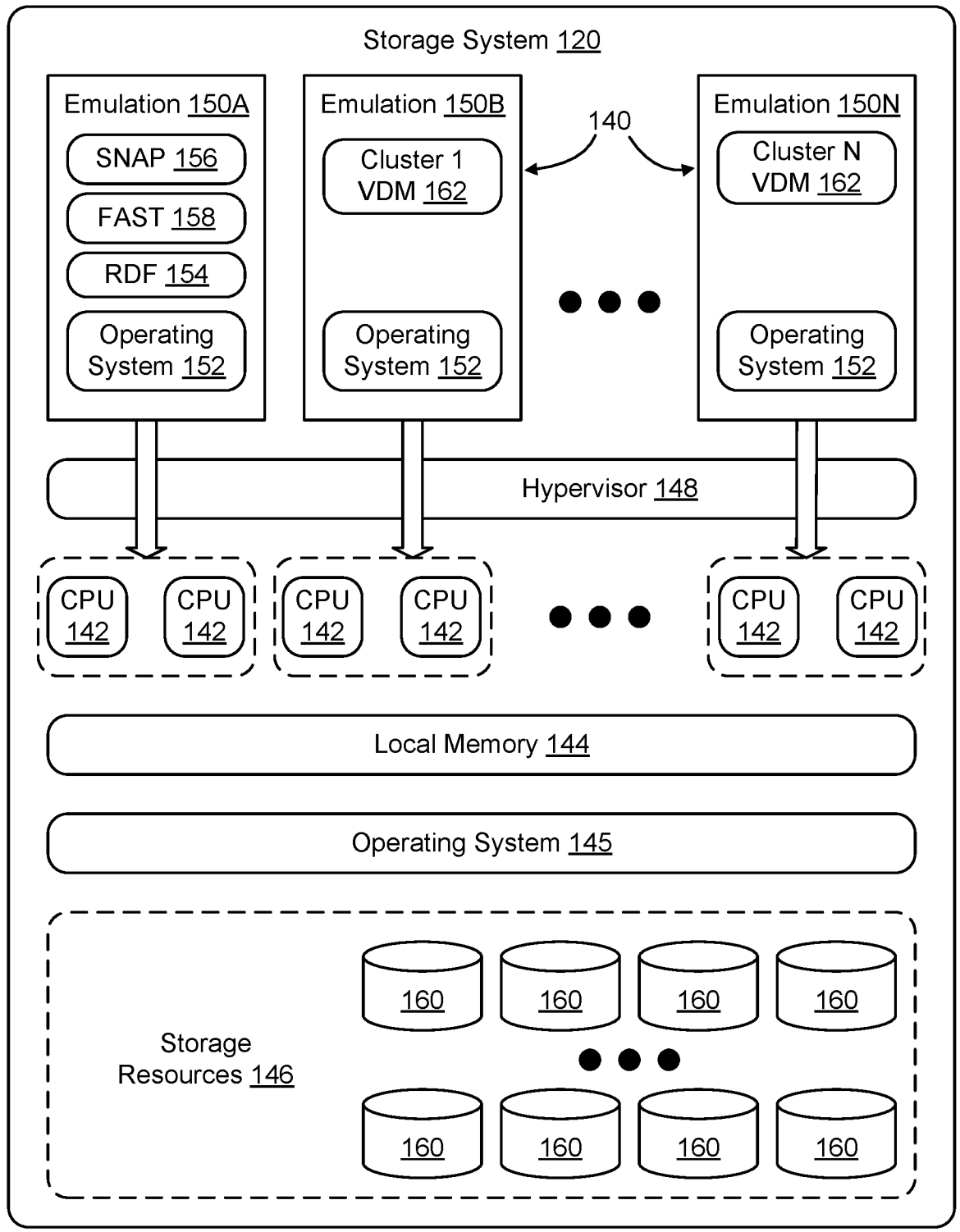
FIG. 1 is a functional block diagram of an example storage system configured to providing dynamic binding and unbinding thin logical storage volumes to snapshots of a file system according to some embodiments of the present disclosure.
Figure 2:
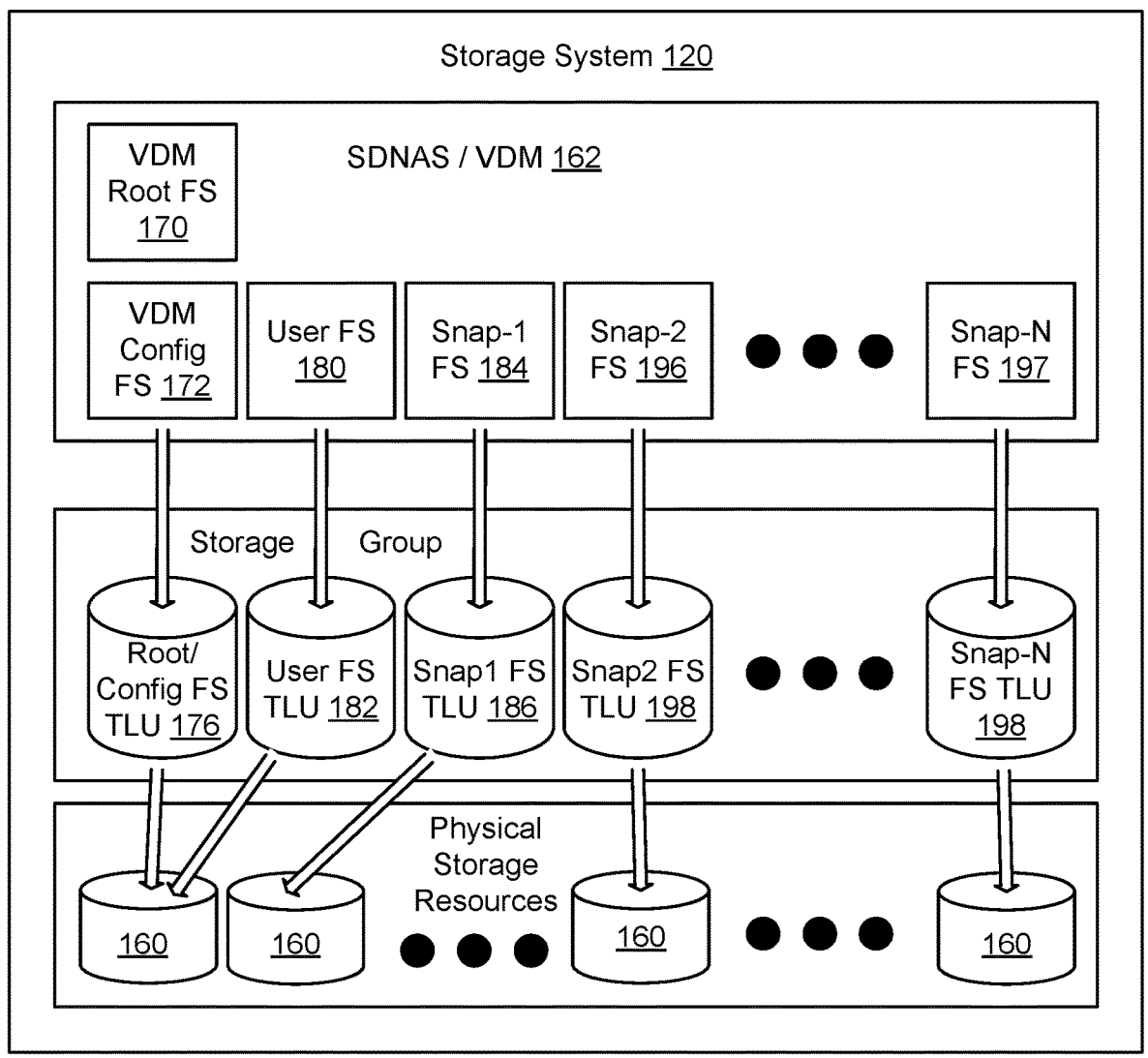
FIG. 2 is a functional block diagram of one emulation of the storage system of FIG. 1 according to some embodiments of the present disclosure.

FIG. 1 is a functional block diagram of an example storage system configured to providing dynamic binding and volume is referred to as "thin" because actual physical storage resources 160 are only allocated by the storage system 120 to the TLU when used. Thus, the amount of physical storage resources 160 allocated to a TLU will increase and decrease over time as the file system stored on the TLU increases and decreases in size.

In some embodiments, the VDM root file system 170 and VDM configuration file system 172 are stored in a first TLU referred to herein as a Root/configuration file system TLU 176. The TLU 176 is stored in physical resources 160 offered by the underlying storage resource pool 178.

Data associated with data client is stored in a user file system 180. The user file system 180 is stored in a separate TLU referred to herein as a user file system TLU 182. Metadata describing the mapping of the user file system TLU 182 to physical storage resources 160 is contained in the VDM configuration file system 172.

The user file system 180 may be backed up by causing the snapshot application 156 to create a point in time copy of the data associated with the user file system 180. If the user file system 180 needs to be restored to an earlier point in time, one of the snapshots may be selected and the user file system may be remounted from the snapshot of the file system as the user file system appeared at the time of creation of the snapshot.

In some embodiments, each time the snapshot application 156 creates a snapshot copy of the user file system, the snapshot copy of the user file system 180 is stored in physical resources 160 of the storage system 120 and accessed by the VDM 162 via a TLU assigned by the operating system 152 to the snapshot copy of the user file system.

Depending on the implementation, a given storage system 120 may enable multiple snapshots of a user file system 180 to be created and maintained in the physical storage resources 160. For example, in some embodiments the storage system 120 supports up to 256 snapshots per user file system 180. Accordingly, if the storage system 120 is handling N user file systems 180, the storage system 120 will need to be able to create a total number of TLUs equal to N*256+N—one TLU for each file system and up to 256 additional TLUs for the snapshot copies of each of the file systems. For example, if a given storage system 120 can support up to 8000 user file systems, this means that the storage system 120 will need to be able to provide on the order of one million TLUs.

However, in some embodiments, the maximum number of TLUs supported by the storage system 120 is much lower, for example in some embodiments the operating system 145 may only be able to support on the order of 64K TLUs. In this instance, the lack of available TLUs becomes a bottleneck on the number of user file systems 180 and/or the number of snapshot copies of the user file systems 180 the storage system 120 can support.

According to some embodiments, a method and apparatus for dynamically binding and unbinding TLUs is provided, such that snapshots file systems are bound to a TLU when created and unbound from the TLU when the snapshot file system is not accessed for a period of time. The underlying data associated with the snapshot file system remains stored in physical storage resources 160 even if unbound from the TLU. If access to a snapshot file system is required and a TLU is not currently bound to the snapshot file system, the storage system 120 binds a free TLU to the snapshot data and then enables the snapshot data of the snapshot file system to be accessed via the newly bound TLU. In this manner, a limited number of TLUs can be used to provide access to a much larger number of user file systems and snapshot copies of the user file systems, such that the limited number of TLUs available on the storage system 120 does not present a bottleneck in the storage system 120.

Figure 3:
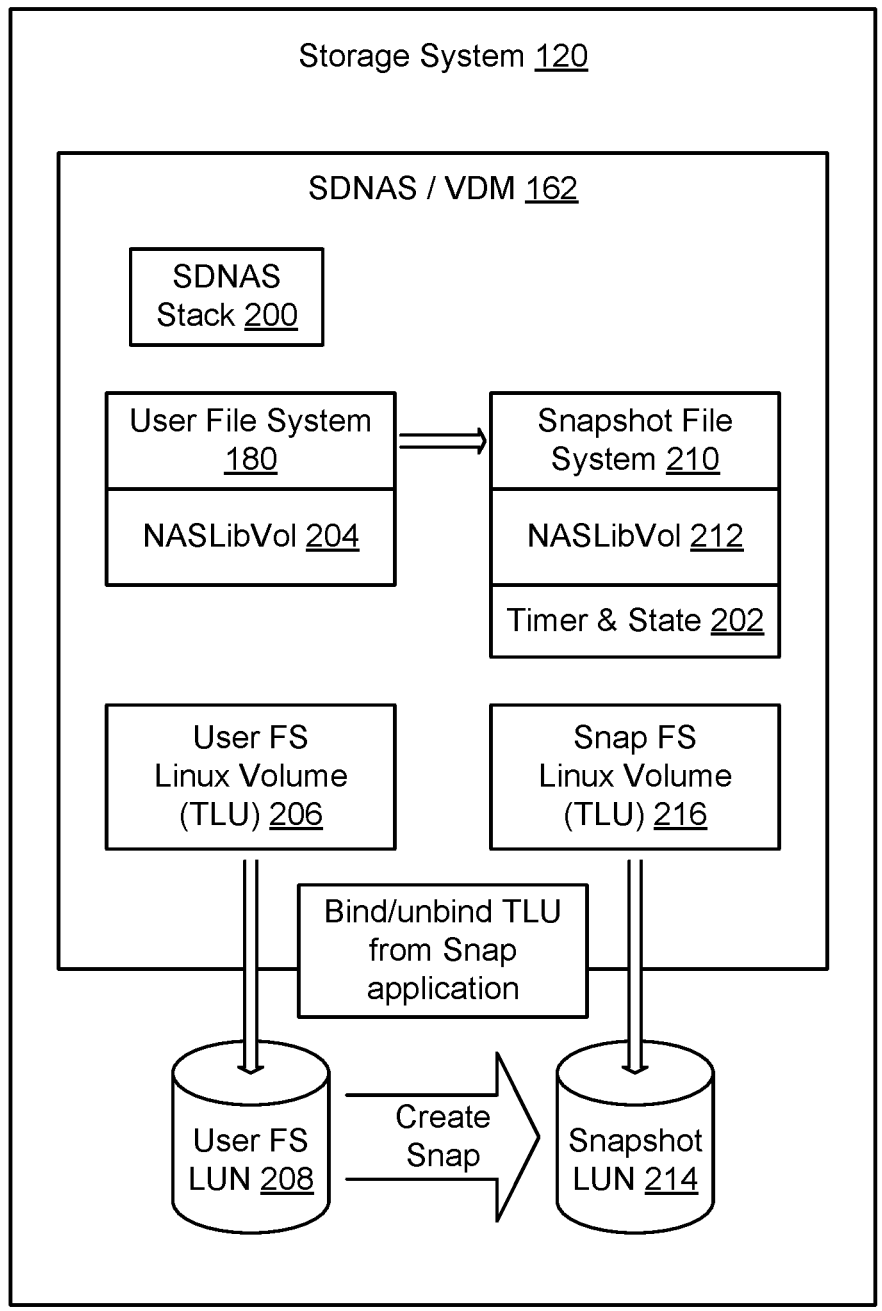
FIGS. 3 and 4 are a functional block diagrams of the emulation of FIG. 2 in greater detail illustrating an apparatus for dynamic binding and unbinding thin logical storage volumes to snapshots of a file system according to some embodiments of the present disclosure.

FIG. 3 shows the architecture of a storage system 120 configured to enable dynamic binding and unbinding of thin logical storage volumes. As shown in FIG. 3, in some embodiments Software Defined Network Attached Storage (SDNAS) server/Virtual Data Mover (VDM) 162 includes a SDNAS stack 200 and a set of timers/state registers 202. A user file system 180 is stored in Network Attached Storage Library Volume (NASLibVol) 204. The user file system 180 is represented by logical User File System Linux volume 206 (TLU) by the operating system 152, which maps the Linux volume to physical storage LUN 208.

The SDNAS server/VDM 162 also includes a snapshot file system 210 that is stored in its own NASLibVol 212. As snapshots are created, the snapshot data is stored in physical storage LUNs 214. The snapshot file system 210 maintains information about where the snapshots are stored in the storage system. Initially, each snapshot is bound to a logical storage volume 216 by the operating system. However, the logical storage volumes are dynamically able to be bound and unbound from the snapshot data sets 214 to enable the logical storage volumes to be used by other processes, for example by other VDMs, in the storage system 120.

Figure 4:
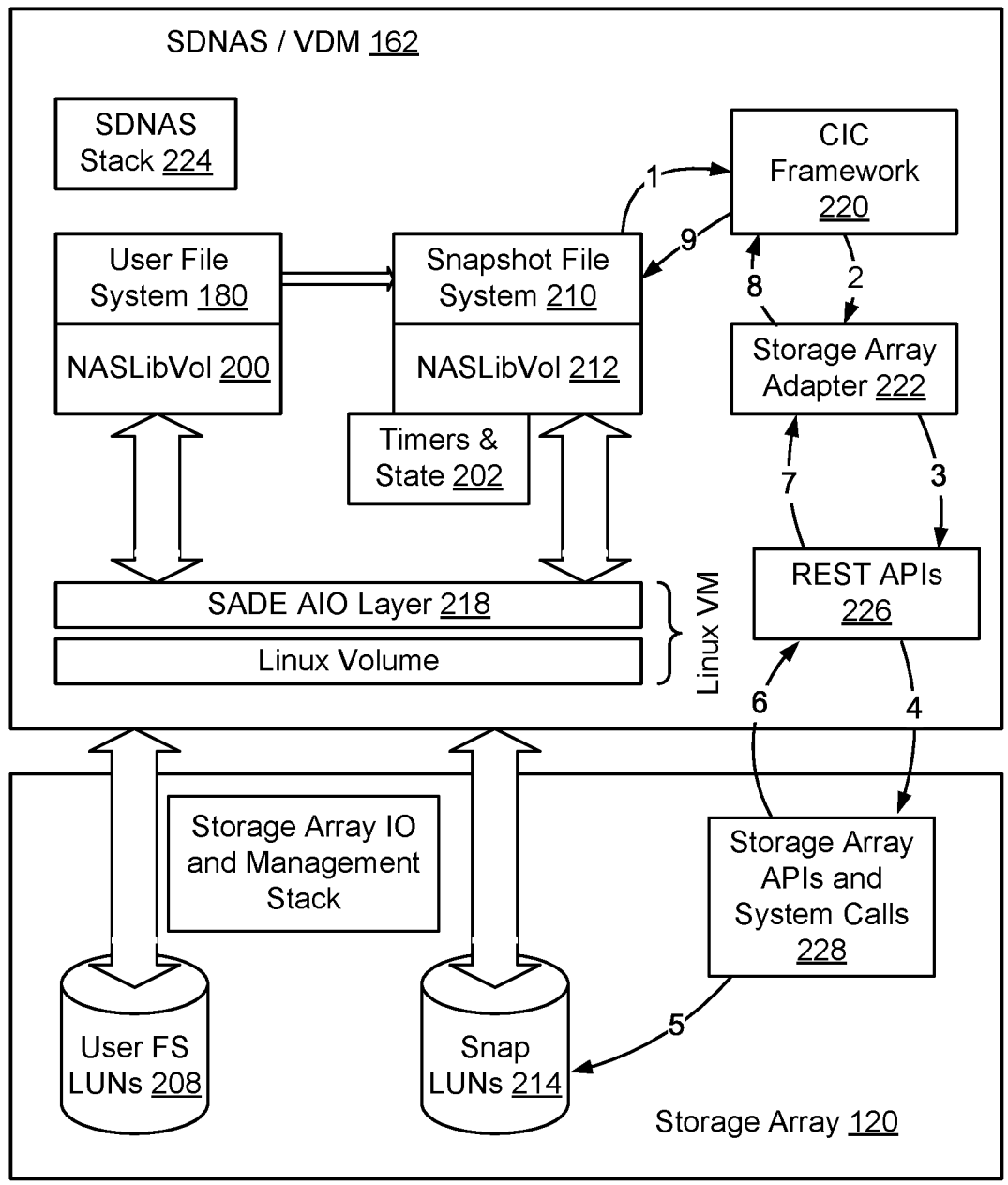

FIG. 4 shows the storage system of FIG. 3 in greater detail, and shows an example flow of messages between components of the storage system 120 to enable dynamic binding and unbinding of thin logical storage volumes according to some embodiments of the present disclosure.

As an overview, when a snapshot of a file system is created, a TLU will be allocated to the snapshot of the file system and the snapshot file system will be mounted. If there is no I/O activity on the snapshot file system for a period of time, the TLU will be unbound from the snapshot file system and the TLU will be returned to a free pool to be used to access other user file systems and other snapshot file systems. If there is subsequent I/O activity on the snapshot file system, for example if a forced read is issued by the snapshot file system to the logical volume layer, the logical volume layer knows that there is no TLU associated with the I/O activity. Accordingly, the logical volume layer will create a bind request to a free LUN pool to bind a free TLU to the snapshot file system. Once the bind goes through, reads can be issued on the newly allocated TLU to enable the data in the snapshot file system to be accessed. In this regard the binding of the logical storage volume results in associating the Linux volume with the block/file in the storage array that is used to store the snapshot data, so that reads can occur by processes supported by the operating system on the newly bound Linux volume.

In some embodiments, the VDM 162 periodically will run a scrubber process to determine which logical storage volumes have not been accessed recently. Optionally this may be based on information maintained by timers and state process 202. Any logical storage volumes without recent activity are candidate logical storage volumes to be unbound.

Figure 5:
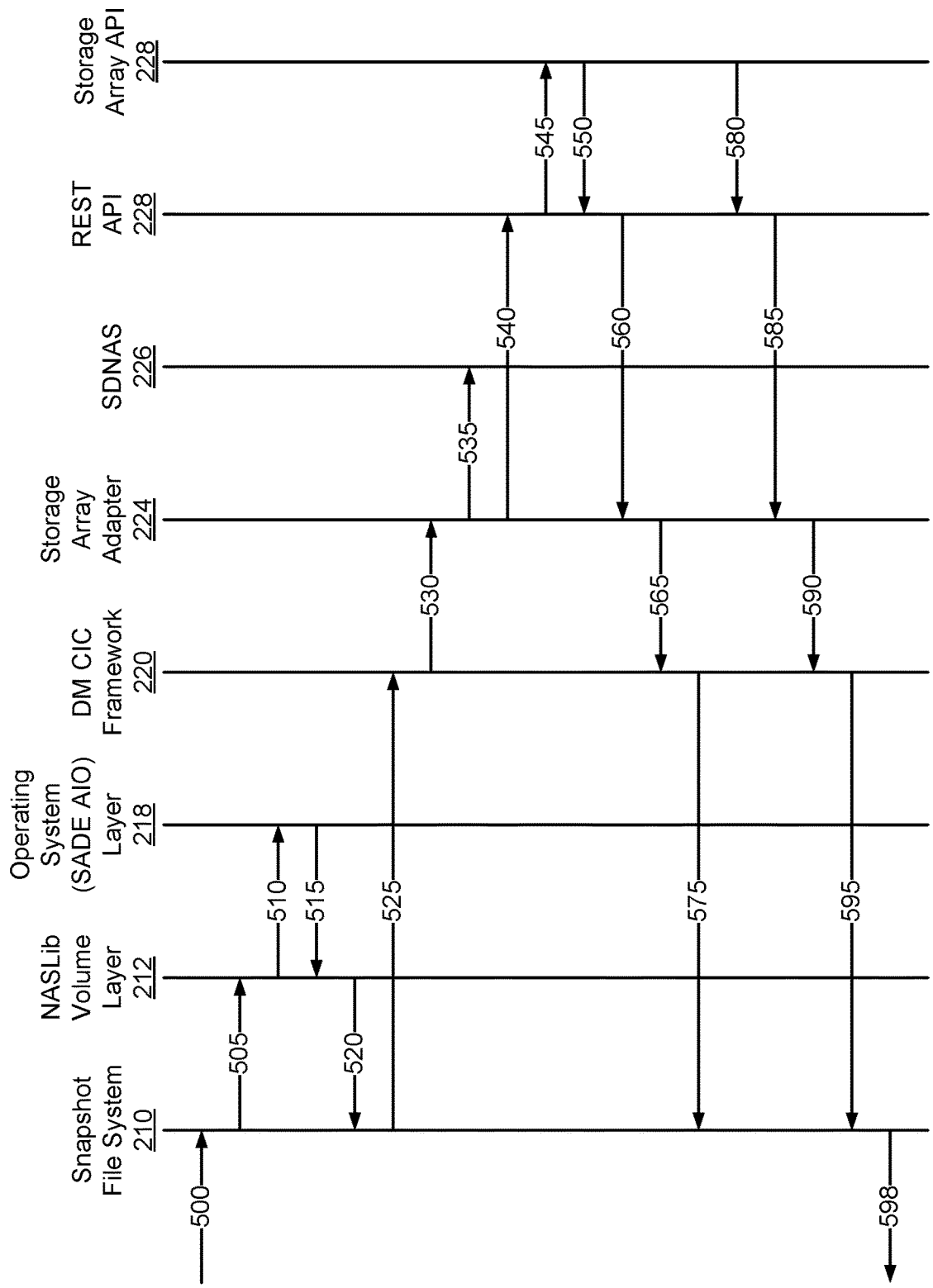
FIG. 5 is a swim lane diagram showing an example process for unbinding a thin logical storage volume from a snapshot of a file system according to some embodiments of the present disclosure.

FIG. 4 shows several arrows that provide a highlight of some of the operations that occur to enable dynamic binding and unbinding of logical storage volumes according to some embodiments of the present disclosure, and FIG. 5 shows a swim lane diagram of a process of unbinding a logical storage volume.

As shown in FIG. 5, periodically a scrubber will be run. In FIG. 5 it is assumed that there has been no recent activity on snapshot file system 210 and, accordingly, a decision was made by VDM 162 to unbind the TLU associated with snapshot file system 210 (arrow 500). Accordingly, the snapshot file system 210 will transmit a message (arrow 505) to the NAS Lib Volume layer 212 instructing the NASLib Volume layer 212 to unbind the logical storage volume (Unbind Linux device). The NASLib Volume layer 212 will instruct (arrow 510) the operating system (SADE AIO Layer 218) to delete the Linux device. At arrow 515 the operating system confirms to the NASLib layer that the Linux device has been deleted, and the NASLib Volume layer 212 confirms (arrow 520) to the snapshot file system 210 that the unbind request on the logical storage volume has been successful.

The snapshot file system 210 will also transmit a message (FIG. 4 arrow 1; FIG. 5 arrow 525) to the Data Mover (DM) Celera InterConnect (CIC) framework 220 to instruct the DM CIC framework 220 to prepare and send a disconnect message to the storage array adapter 222. The DM CIC framework 220 transmits a message to the storage array adapter (FIG. 4 arrow 2; FIG. 5 arrow 530). Upon receipt of the disconnect message, the storage array adapter 222 updates the database in the SDNAS stack 224 (arrow 535) and sends an unlink Logical Unit Number and snapshot volume message (FIG. 4 arrow 3; FIG. 5 arrow 540) to the Representational State Transfer (REST) Application Program Interface (API) 226.

REST API issues various storage array system calls (FIG. 4 arrow 4; FIG. 5 arrow 545) on the storage system APIs 228, to unlink the logical unit number and snapshot file system in the physical storage resources offered by the storage system 120 (FIG. 4 arrow 5). If successful, the storage array API will transmit an unlink done message (FIG. 4 arrow 6; FIG. 5 arrow 550) to the REST API 226. The Rest API 226 transmits an unlink done message (FIG. 4 arrow 7; FIG. 5 arrow 555) to the storage array adapter 222. The unlink done message is also sent from the REST API to the DM CIC framework 220 (FIG. 4 arrow 8; FIG. 5 arrow 565), which will in turn notify the snapshot file system 210 that the unlink has been completed successfully on the storage array (FIG. 4 arrow 9; FIG. 5 arrow 575). If the unlink is not successful, arrows 580, 585, 590, 595 of FIG. 5 are used to notify the snapshot file system 210 that the unlink was not successfully completed in the storage array. Optionally, notification may be provided to the scrubber process (arrow 598) when unbind operations are successfully completed.

Figure 6:
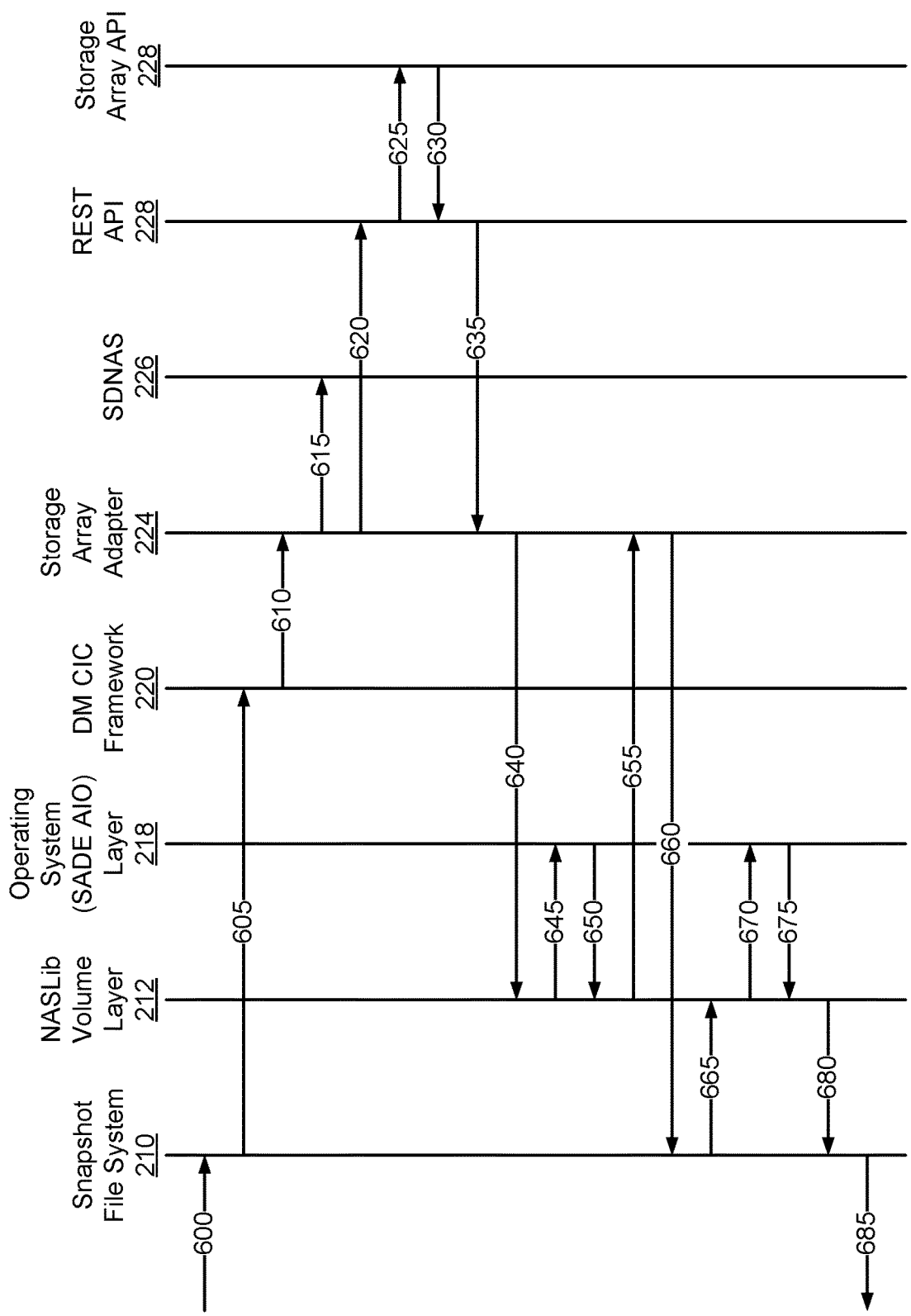
FIG. 6 is a swim lane diagram showing an example process of binding a thin logical storage volume from a snapshot of a file system according to some embodiments of the present disclosure.

If a read is subsequently performed on a file system that is not currently associated with a logical storage volume, it is necessary to bind a logical storage volume to the file system to enable the I/O operation to execute through the operating system. FIG. 6 shows an example process of performing an IO operation during and after an unbind. The result of FIG. 6 is that a logical storage volume is linked to the LUN containing the snapshot data in the storage array, so that IOs can be executed on the logical storage volume to access the data stored in the LUN.

As shown in FIG. 6, if an IO is issued on the snapshot file system 210 for access to data stored in a LUN that is not bound to a logical storage volume (arrow 600), the snapshot file system 210 will send a message (FIG. 4 arrow 1; FIG. 6 arrow 605) to the DM CIC framework 220 to initiate binding of a logical storage volume. The message (arrow 605) instructs the CIC framework to prepare a Data Mover Interconnect (DIC) message and instructs the CIC framework to send the DIC message (FIG. 4 arrow 2; FIG. 6 arrow 610) to the storage array adapter 222.

The storage array adapter 222 accesses the database maintained by SDNAS 224 (arrow 615) to obtain the Disk ID and LUN ID so that the storage array adapter 222 knows what storage volumes within the storage array should be linked to the logical storage volume that will be bound. The storage array adapter 222 transmits a message (FIG. 4 arrow 3; FIG. 6 arrow 620) to the REST API to link the Logical Unit Number and snapshot volume message. The REST API issues various storage array system calls (FIG. 4 arrow 4; FIG. 6 arrow 625) on the storage system APIs 228, to link the logical unit number and snapshot file system 210 in the physical storage resources offered by the storage system 120 (FIG. 4 arrow 5).

Once the storage array has processed the link request, the storage array 228 replies to the REST API with a link done message (FIG. 4 arrow 6; FIG. 6 arrow 630). The REST API sends a message (FIG. 4 arrow 7; FIG. 6 arrow 635) to the storage array adapter 222 that the link has been completed in the storage array and with an instruction for the storage array adapter 222 to create a logical storage volume (Linux device).

The storage array adapter 222 transmits an instruction to the NASLib Volume Layer 212 to instruct the NASLib Volume Layer to create the logical storage volume (Linux device) (FIG. 4 arrows 8 and 9; FIG. 6 arrow 640). The NASLIB Volume Layer instructs (FIG. 6 arrow 645) the operating system 218 to create the logical storage device. Once the operating system has created the logical storage device, the operating system responds with the identification of the logical storage device (FIG. 6 arrow 650). The NASLib Volume Layer transmits a message (FIG. 6 arrow 655) to the storage array adapter 222 to notify the storage array adapter that the logical storage device has been created and to instruct the storage array adapter to bind the logical storage device to the snapshot LUN.

Once the bind has occurred, the storage array adapter 222 transmits a bind done message (FIG. 6 arrow 660) to the snapshot file system 210. The snapshot file system 210 can then issue read/write operations (FIG. 6 arrows 665, 670, 675, 680) to access the data stored in the snapshot LUN via the newly bound logical storage volume presented by the operating system. The data read from the snapshot LUN is then returned (FIG. 6 arrow 685).

According to some embodiments, the storage array provides LUNs that are thin and bound to a single snapshot file system. Initially, the snapshot file system has access to the LUNs offered by the storage array via logical storage volumes offered by the operating system of the emulation in which the snapshot file system is executing. If the operating system is a Linux operating system, the logical storage volumes are Linux devices that are presented to the snapshot file system and through which the snapshot data of the LUN is accessible to the snapshot file system.

If a logical storage volume is not accessed for a period of time, for example 10 minutes, the association between the logical storage volume and the snapshot data stored in the LUN is removed. By unbinding the logical storage volume from the LUN containing the snapshot data, it is possible for the logical storage volume that was previously assigned to the snapshot file system to be reassigned to other LUNs maintained by the storage array. Thus, the logical storage volume can be used by other processes such as other VDMs 162 to access data stored in other LUNs by the storage system 120.

Notably, unbinding the logical storage volume from the LUN on which the snapshot is stored does not cause the snapshot data that is contained in the LUN to be deleted.

Accordingly, if it is later necessary to access the snapshot data stored in the LUN, a new logical storage volume can be linked by the operating system to the LUN that is storing the snapshot data, to enable the snapshot file system to access the snapshot data via the newly linked logical storage volume.

In some embodiments, logical storage volumes are automatically unbound whenever the snapshot data is not accessed for a period of time. In some embodiments, if a file system is a snapshot file system, a timer in timer and state process 202 is initiated on a first READ access on the snapshot file system. Every time the snapshot file system is accessed, the timer is updated for example by being reset. When the timer times out, an unbind routine is called and the VDM 162 triggers the unbind process described herein in connection with FIG. 5. The snapshot file system 210 and logical storage volume will be marked as unbound and an unbind thread will start on the emulation to try to unbind the logical storage volume.

If a read occurs that is directed to snapshot data in a LUN on the storage system that is not currently bound to a logical storage volume, a CIC event will be sent to bind a free logical storage volume to the LUN containing the snapshot data in the storage system. In some embodiments, the timers and state process 202 implements a timer to limit the amount of time the VDM will wait in the event the bind is unsuccessful.

The CIC event is sent to the storage array adapter, which sends a link command to link the snapshot data stored in the LUN at the storage array to the logical storage volume. The storage array adapter also sends a disk bind command to instantiate the logical storage volume and bind it to the existing NASLib volume. The NAS Server sets the NAS Lib Volume state to Bound. The storage array acknowledges the bind event to the NAS Server and to the snapshot file system. The snapshot file system can then send regular READ instructions to read snapshot data through the logical storage volume.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of dynamic binding and unbinding thin logical storage volumes to data volumes stored in a storage array, the computer program including a set of instructions which, when executed by a computer, cause the computer to perform a method comprising the steps of:
creating a snapshot copy of a user file system;
storing the snapshot copy of the user file system in a data volume (LUN) in the storage array;
binding a logical storage volume to the data volume;
using the logical storage volume, by a snapshot file system, to access the data volume;
determining that the data volume has not been accessed for a predetermined period of time; automatically
unbinding the logical storage volume from the data volume; and
maintaining the snapshot copy of the user file system in the data volume after the step of automatically unbinding the logical storage volume from the data volume.

2. The non-transitory tangible computer readable storage medium of claim 1, wherein the snapshot file system is executing in the context of a first operating system, and wherein the storage array is managed by a second operating system.

3. The non-transitory tangible computer readable storage medium of claim 2, wherein the step of automatically unbinding the logical storage volume from the data volume comprises deleting the logical storage volume in the first operating system.

4. The non-transitory tangible computer readable storage medium of claim 2, wherein the step of automatically unbinding the logical storage volume from the data volume comprises sending a disconnect message to a storage array adapter.

5. The non-transitory tangible computer readable storage medium of claim 4, wherein the step of automatically unbinding the logical storage volume from the data volume comprises sending, by the storage array adapter, an unlink message identifying the first logical storage volume and the data volume, the unlink message being sent to a Representational State Transfer Application Program Interface (REST API).

6. The non-transitory tangible computer readable storage medium of claim 5, further comprising issuing, by the REST API, storage array system calls on the storage array to unlink the logical storage volume from the physical storage resources holding the data volume in physical storage offered by the storage array.

7. The non-transitory tangible computer readable storage medium of claim 1, further comprising:

receiving an access event on the data volume after the step of automatically unbinding the logical storage volume from the data volume;

binding a second logical storage volume to the data volume; and using the second logical storage volume, by the snapshot file system, to access the data volume.

8. The non-transitory tangible computer readable storage medium of claim 7, wherein the snapshot file system is executing in the context of a first operating system, and wherein the storage array is managed by a second operating system.

9. The non-transitory tangible computer readable storage medium of claim 8, wherein the step of binding the second logical storage volume to the data volume comprises sending a connect message to a storage array adapter.

10. The non-transitory tangible computer readable storage medium of claim 8, wherein the step of binding the second logical storage volume to the data volume comprises determining, by the storage array adapter, a location of the data volume in physical storage offered by the storage array.

11. The non-transitory tangible computer readable storage medium of claim 10, wherein the step of binding the second logical storage volume to the data volume comprises sending, by the storage array adapter, a link message identifying the second logical storage volume and the data volume, the link message being sent to a Representational State Transfer Application Program Interface (REST API).

12. The non-transitory tangible computer readable storage medium of claim 11, further comprising issuing, by the REST API, storage array system calls on the storage array to link the second logical storage volume with the physical storage resources holding the data volume in physical storage offered by the storage array.

13. A storage system, comprising:
a storage array having physical storage resources;
a software defined network attached storage process running in an emulation on the storage system;
a user file system running in the context of the software defined network attached storage process;
a snapshot file system running in the context of the software defined network attached storage process; and
control logic configured to:
create a snapshot copy of the user file system;
store the snapshot copy of the user file system in a data volume (LUN) in the storage array;
bind a logical storage volume to the data volume;
use the logical storage volume, by a snapshot file system, to access the data volume;
determine that the data volume has not been accessed for a predetermined period of time; automatically unbind the logical storage volume from the data volume; and
maintain the snapshot copy of the user file system in the data volume after automatically unbinding the logical storage volume from the data volume.

14. The storage system of claim 13, wherein the snapshot file system is executing in the context of a first operating system, wherein the storage array is managed by a second operating system, and wherein the control logic configured to unbind the logical storage volume from the data volume comprises control logic configured to automatically delete the logical storage volume in the first operating system.

15. The storage system of claim 14, wherein automatically unbinding the logical storage volume from the data volume comprises control logic configured to:
send a disconnect message to a storage array adapter;
send, by the storage array adapter, an unlink message identifying the first logical storage volume and the data volume, the unlink message being sent to a Representational State Transfer Application Program Interface (REST API); and
issue, by the REST API, storage array system calls on the storage array to unlink the logical storage volume from the portion of the physical storage resources holding the data volume in the physical storage resources of the storage system.

16. The storage system of claim 13, further comprising control logic configured to:
receive an access event on the data volume after automatically unbinding the logical storage volume from the data volume;
bind a second logical storage volume to the data volume; and
use the second logical storage volume, by the snapshot file system, to access the data volume.

17. The storage system of claim 16, wherein the snapshot file system is executing in the context of a first operating system, wherein the storage array is managed by a second operating system, and wherein the control logic configured to bind the second logical storage volume to the data volume is configured to send a connect message to a storage array adapter.

18. The storage system of claim 17, wherein the control logic configured to bind the second logical storage volume to the data volume is configured to:
determine, by the storage array adapter, a location of the data volume in physical storage resources;
send, by the storage array adapter, a link message identifying the second logical storage volume and the location of the data volume in the physical storage resources, the link message being sent to a Representational State Transfer Application Program Interface (REST API); and
issue, by the REST API, storage system calls on the second operating system to link the second logical storage volume with the physical storage resources holding the data volume in physical storage.

* * * * *